Jan. 27, 1970   L. R. ALLEN, JR., ET AL   3,492,013
VEHICLE STABILIZER SYSTEM WITH POWER VALVE DAMPING
Filed May 25, 1967

INVENTORS
Laird R. Allen, Jr.
and William O. Osbon
BY *J.Y. Brodahl*
ATTORNEY

United States Patent Office 3,492,013
Patented Jan. 27, 1970

3,492,013
VEHICLE STABILIZER SYSTEM WITH
POWER VALVE DAMPING
Laird R. Allen, Jr., Monroeville, and William O. Osbon, Pittsburgh, Pa., assignors to Westinghouse Electric Corporation, Pittsburgh, Pa., a corporation of Pennsylvania
Filed May 25, 1967, Ser. No. 641,249
Int. Cl. B62d 37/00; B60g 23/00
U.S. Cl. 280—6                                    4 Claims

ABSTRACT OF THE DISCLOSURE

An improved fluid actuated stabilizing system for vehicles having sprung and unsprung masses accomplished by improved passive damping of the unsprung mass and augmented feedback damping of the sprung mass. The pressure drop caused by fluid flow through the inlet and outlet power valves is used to provide passive damping to the associated unsprung mass as well as to provide additional feedback damping needed to damp the effective associated sprung mass. The magnitude of damping provided is determined by the power valve design and the amplification associated with the feedback of the pressure drop across the power valves.

Background of the invention

This invention relates generally to fluid power devices, and more particularly, to an active vehicle stabilizer system with power valve damping.

The combination of greatly improved highways and the momentous technological advancements by the engineers who design vehicle suspension systems have brought the riding comfort of the modern passenger automobile to a high state of perfection. The tremendous acceptance of the automobile as a means of conveyance by the traveling public is undisputable proof of this statement. It might even be argued further major improvements in the riding qualities of today's larger passenger automobiles are of questionable importance and utility; however, this is certainly not the case for military vehicles. Designers of these machines have taken full advantage of the numerous improvements in engineering materials and suspension components developed over the years. They have themselves contributed many design innovations particularly applicable to military vehicles. Among the latter are the use of independent wheel arm suspensions with torsion bar springing, four or more wheels per side, and increased wheel travels. These notable improvements, however, still leave much to be desired in riding comfort because of the rough terrain most military vehicles are required to traverse. The cross-country speed of the typical vehicle is limited because the operator and passengers simply will not tolerate speeds which are uncomfortable or hazardous. Any major improvement in riding quality, therefore, can raise the maximum tolerable speed of the vehicle and thus increase its military usefulness.

Summary of the invention

It is, therefore, an object of the present invention to provide an improved stabilizer system for military and other vehicles.

An additional object of the present invention is to provide an improved stabilizer system for vehicles such that higher maximum speeds can be tolerated by the operators and passengers.

A further object of the present invention is to provide an improved vehicular stabilizing system offering significant reductions in structure, complexity and expense over prior stabilizing systems.

Yet, a still further object of the present invention is to provide an improved vehicular stabilizing system wherein the inlet and outlet power valves are designed so that the pressure drop caused by flow through them is sufficient to provide the passive damping required by that portion of the unsprung mass of the vehicle associated with each control unit.

A still further object of the invention is to provide an improved vehicular stabilizing system wherein the aforementiond power-valve pressure drop is fed back to an inertial sensing element in such a manner as to provide the additional damping needed to damp the total effective sprung mass including the synthetic mass.

A preferred embodiment of the present invention would use a system having an acceleration sensing controller at each corner of the vehicle body. Each of these devices controls the flow of hydraulic fluid from a central power source to hydraulic actuators which replace the conventional shock absorbers. The actuator forces produced by the controllers are mainly proportional to body acceleration and oppose body motion. They have all the attributes of inertia reaction forces of the body mass itself. Consequently, the control system action is equivalent to an increase in the effective body or sprung mass. By virtue of hydraulic amplification, a small control mass appears as a very much larger mass at the actuator. The additional "synthetic" mass reduces the resonant frequency of the body just as softer springs would. The improvement is achieved, however, without loss of roll stability or the attitude changes accompanying load variations which attend the latter method of ride improvement. The total effective body mass of a typical vehicle with active inertia control can be from 4 to 8 times the actual mass. The corresponding reduction in body frequency by a factor of 2 to 3 results in a major improvement in riding comfort.

A significant feature of this invention is the recognition that the power valves, which control the fluid flow into and out of the actuators attendant with each wheel of the vehicle, provide some passive damping themselves. By correctly proportioning this power valve damping, the amount of damping required by the unsprung mass associated with each controller is provided. In addition, feedback control of the pressure drop across the power valves is provided for the additional damping necessitated by the total effective sprung mass including the synthetic mass obtained by control action.

The objects of our invention hereinbefore recited are merely illustrative. Other objects and advantages will become more readily apparent from a study of the following specification when made in conjunction with the accompanying drawings.

Description of the preferred embodiment

Figure 1:
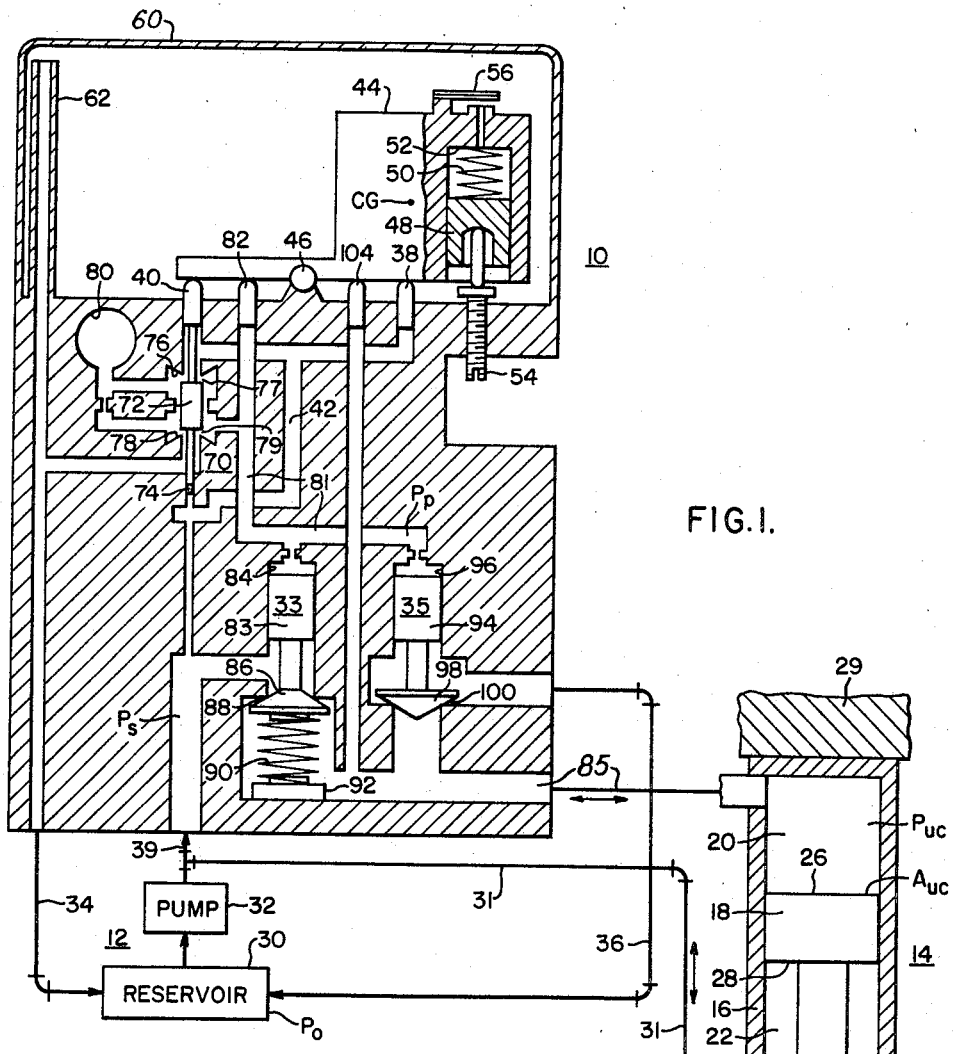
FIGURE 1 illustrates a preferred embodiment of the vehicle stabilizer system.

Referring now to FIG. 1, there is indicated by the general reference numeral 10 an acceleration responsive sensing and control unit for controlling the flow of fluid between a fluid supply system 12 and a fluid power actuator-type shock absorber 14. By way of example, the system is hydraulic, and the fluid may be oil. The actuator 14 includes a cylinder 16 having slidably disposed therein a piston 18 which divides the cylinder into expansible chambers 20 and 22. As a practical matter, the relative diameters of the piston 18 and the connecting rod 24 are arranged to provide an approximately 2 to 1 ratio between the areas of the piston's upper and lower pressure faces 26 and 28. The cylinder 16 is coupled to the vehicle body or frame 29 and the outer end of the piston rod 24 is coupled to an axle or wheel of the vehicle.

The fluid power supply system 12 includes a reservoir 30 and a constant-pressure pump 32. The reservoir is supplied by return lines 34 and 36 and this reservoir serves as an input source to the pump 32. Fluid flow into and out of the expansible chamber 20 of the actuator 14 is controlled by an inlet power valve 33 and an outlet power valve 35. A connecting line 31 between expansible chamber 22 of actuator 14 and the output line 39 of the constant-pressure pump 32 provides a flow path in and out of expansible chamber 22. Output from the pump 32 is fed both to the inlet power valve 33 through channel 39 and also to a compensating piston 38 and pilot valve 72 through channel 42. Although the supply source 32 is shown as supplying fluid under pressure to only one controller 10 and one shock absorber or actuator 14, such a supply source may be employed to supply a plurality of such devices. Each wheel position of a multiwheel vehicle may be provided with a shock absorber and associated sensing and control unit of the type disclosed herein. Also in some vehicles having more than four wheels, each control unit may control fluid flow to more than one actuator.

The unit 10 houses many components of the system, including valves and an acceleration sensing member 44. The acceleration sensing member 44 is mounted on a frictionless leaf spring pivot 46. The weight of the acceleration sensing member 44 is heavily damped to about 4 to 5 times critical by a dashpot piston 48. Abutting the end surface of the dashpot piston 48 is a gravity spring 50 whose other side rests upon the upper surface of the dashpot cylinder 52. External adjustment of the quiescent operating point of the control unit 10 can be made by adjusting the gravity spring 50 through an adjusting pin 54 and the dashpot piston 48. The viscous dashpot resistance is thermostatically controlled by a bimetal damper valve 56 to insure reasonably constant damping over the operating temperature range. The entire region surrounding the inertial sensing member 44 is filled with hydraulic fluid and surrounded by a cover 60. When the fluid level rises above the vent 62, surplus fluid will overflow through the vent 62 through reservoir return line 34 to the reservoir 30. In this manner, sufficient depth of oil is maintained in cover 60 to prevent air entering the dashpot chamber.

Pendulous response to roll angles and lateral accelerations is achieved by disposing the center of gravity of the inertial sensing member 44 at an angle above the horizontal as shown by CG. The banking sensitivity depends upon the vertical distance of the center of gravity above the pivot 46. Response to fore-and-aft accelerations for anti-dive is obtained either by tilting the unit about a lateral axis or by rotation about a vertical axis. In either case, a shift in the proper sense of only 2 to 4 degrees, depending upon the control mass geometry, is sufficient. Vertical sensitivity, of course, depends upon the horizontal distance from the pivot 46 to the center of gravity CG. Response to angular accelerations about the vehicle's roll axis also depends upon this distance as well as upon the disposition of the controller 10 relative to the roll axis of the vehicle. Roll angle response tends to level the vehicle transversely when operating, for example, on high-crowned roads. In response to a vertical or a lateral acceleration of the vehicle, the acceleration sensing member 44 will tend to rotate either clockwise or counterclockwise about its pivot 46, depending upon the direction of acceleration. For example, in response to upward or to leftward accelerations as viewed in FIG. 1, the inertial sensing member will rotate in a clockwise direction. On the other hand, in response to either downward or rightward acceleration as viewed in this figure, the acceleration sensing member 44 will rotate counterclockwise about the pivot 46.

The acceleration sensing member 44 is biased in a neutral position by the action of the force transmitted by the gravity spring 50 against the upper cylinder surface 52 enclosed in the acceleration sensing member 44.

Included in the controller 10 is a pilot circuit 70. Operation of the pilot circuit 70 is achieved through movement of a pilot valve 72 having connected thereto a pilot piston 40 on one end and a bias piston 74 on the other. The pilot piston 40 is responsive to movement of the acceleration sensing member 44 to move the pilot valve 72 to varying positions within an upper chamber 76 and a lower chamber 78. Attached to this upper and lower chamber is a cavity 80 having an input from the upper chamber 76 and transmitting its output through the lower chamber 78. The upper chamber 76 has as its input the supply pressure through line 42 and upper pilot valve opening 77. The lower chamber 78 exits to the the reservoir through lower pilot valve opening 79 and line 34. Chamber 78 connects to the input and output power valves 33 and 35 through line 81. Line 81 also leads to a pilot feedback piston 82 which is slidably disposed in line 81 and is in contact with the acceleration sensing member 44.

In the normal quiescent condition the controller is adjusted by means of adjusting screw 54 to position pilot valve 72 so that upper pilot valve opening 77 and lower pilot valve opening 79 are substantially equal. For this condition the pressure in chamber 78 is approximately half the supply pressure. When the acceleration sensing member 44 moves clockwise, the pilot piston 40 and valve 72 move upward tending to close upper pilot valve opening 77 and to open the lower pilot valve opening 79. The pressure drop across opening 77 therefore increases and that across opening 79 decreases causing the pressure in line 81 connected to chamber 78 to decrease thus becoming closer to the reservoir pressure. On the other hand, should the acceleration sensing member 44 rotate in a counterclockwise position, the pilot piston 40 and valve 72 would move down to close lower pilot valve opening 79 and open the upper pilot valve opening 77. In this instance, the pressure in chamber 78 and line 81 would increase, approaching the supply pressure. Valve 72 is forced to follow acceleration sensing member 44 by the action of the supply pressure applied to the bottom of piston 74. The upward force exerted by piston 40 against the sensing member 44 is balanced by the supply pressure acting on the bottom of compensating piston 38.

To compressibility of the oil in the cavity 80 in combination with the upper and lower chambers 76 and 78 and the hydraulic resistances of pilot valve openings 77 and 79 comprises a low pass hydraulic filter to attenuate the response of the controller at frequencies above wheel-hop frequency. The attenuation is required to prevent parasitic oscillations which are aggravated by resonant vibration of the vehicle frame independently of the entire sprung mass.

The controller 10 is equipped with two power valves: an inlet power valve 33 for supplying power fluid to the expansible chamber 20, and an outlet power valve 35 for exhausting fluid from the chamber 20. The inlet and outlet valves 33 and 35 are also appropriately referred to as power fluid supply and power fluid exhaust valves, respectively. The supply valve 33 is provided with a power fluid outlet coupled to chamber 20 through a power fluid conduit 85. The exhaust valve 35 is provided with a power fluid intake coupled through conduit 85 to the chamber 20. The inlet power valve consists of a valve piston 83 slidably disposed in a cylinder 84. Connected to one end of the valve piston is a valve and valve stem 86 which is normally closed against the valve seat 88. A leakage control spring 90 is provided to exert a force between a platform 92 and the under surface of the valve 94 to control fluid leakage. The outlet power valve 35 is similarly comprised of a valve piston 94 slidably disposed in a cylinder 96. The valve piston 94 is connected to an outlet valve and stem 98 which is normally in a closed position against the valve seat 100. The inlet power valve 33 admits hydraulic fluid from the power supply line 39 to the upper cylinder portion 20 when the pressure in line 81 is greater than that in the upper cylinder portion 20. Any downward motion of the piston 18 will reduce the pressure in the upper expansible chamber 20 whereupon the pressure in line 81 will force the inlet power valve piston 83 downward and admit fluid until the pressure is equalized. Similarly, any upward motion of the piston 18 would increase the pressure in the upper expansible chamber 20 such that the pressure difference between that of the upper expansible chamber 20 and that of line 81 will force the valve 98 of the outlet power valve 35 upward and release fluid back to the return line 36. A feedback piston 104 is responsive to the pressure in the upper expansible chamber 20 to provide a torque acting on the acceleration sensing member 44 in a counterclockwise direction.

Typical operation of the controller 10 may be described as a consequence of movement of the piston 18 in response to variations in road surface picked up by the connecting rod 24. If the acceleration sensing member 44 rotates about the pivot axis 46 in a counterclockwise direction in response, for example, to a downward body acceleration, the pilot piston 40 is displaced downward from its normal central position. This increases the upper pilot valve opening 77 and decreases the lower pilot valve opening 79 while the pilot pressure in line 81 rises. Pilot pressure is applied to the pilot feedback piston 82 and to the upper piston portion of the inlet and outlet power valve pistons 83 and 94. The pilot valve itself 72, is balanced for pilot pressures, and the pilot feedback piston 82, therefore, provides the hydraulic stiffness against which the acceleration sensing member 44 operates. The combined action of the pilot feedback piston 82 and the feedback piston 104 provide a torque on the acceleration sensing member 44 proportional to the pressure drop across the power valves. This torque provides augmented damping for the total effective mass associated with the actuator 14.

Both the inlet power valve 33 and the outlet power valve 35 are normally seated. They are pressure control valves as contrasted to flow control valves. The increase in pilot pressure in line 81 acting on the inlet power valve 33 pushes the piston 83 downward to cause a momentary opening of valve 86 from its seat 88 to permit hydraulic fluid to flow from the power supply line 36 into the upper cylinder area of the actuator 20. As the pressure in the upper cylinder 20 increases to equal the pilot pressure, the opposing forces on the two ends of the inlet power valve 33 approach a balance and the valve closes. Meanwhile, the increased pressure in the upper cylinder 20 develops an upward force on the vehicle body 29 that opposes the downward acceleration which originally initiated the action dscribed.

On the other hand, if the acceleration sensing member 44 rotates about its pivot axis 46 in a clockwise direction in response, for example, to an upward body acceleration, the displacement of pilot piston 40 causes valve 72 to move upward from its normal central position. This, in turn, decreases the upper pilot valve opening 77 and increases the lower opening 79 causing the pilot pressure in line 81 to decrease. The consequent decrease in pilot pressure acting on the outlet power valve 35 causes a momentary lifting of valve 98 from its seat 100 to permit hydraulic fluid to flow from the upper cylinder 20 of the actuator to the return line 36. As the pressure in the upper expansible chamber 20 decreases to equal the pilot pressure, the opposing forces on the two ends of the outlet power valve 35 approach a balance and the valve closes. In this manner, the decreased upper cylinder pressure develops a downward force on the vehicle body 29 that opposes the upward acceleration which originally initiated the action.

The pressure in the upper cylinder 20 is applied to the small feedback piston 104 to the right of the pivot 46 in the controller 10. The combination of this feedback piston 104 and the pilot feedback piston 82 produces a torque on the acceleration sensing member 44 which is proportional to the pressure drop across the power valves 33 and 35. The change in valve pressure drop across the power valves, and hence the feedback torque, is proportional to the relative velocity of the displacement of the actuator piston 18. The feedback torque, therefore, might be expected to produce a force on the actuator piston 18 having the attributes of additional passive damping with its attendant increased transmission to the body 29. Such is not the case, however, because the feedback torque for relative motions caused mainly by wheel motions is cancelled by the inertia torque on the acceleration sensing member 44 resulting from body acceleration induced by the wheel motion. Consequently, there is no increase in damping due to feedback. But, for relative motions originating mainly at the body 29, the feedback torque has the proper direction and magnitude to provide an additional damping force at the actuator required to adequately damp the total effective body mass 29.

The compensating piston 38 balances the steady state hydraulic torque on the acceleration sensing member 44. This balance is unaffected by supply pressure fluctuations in line 42.

Figure 2:
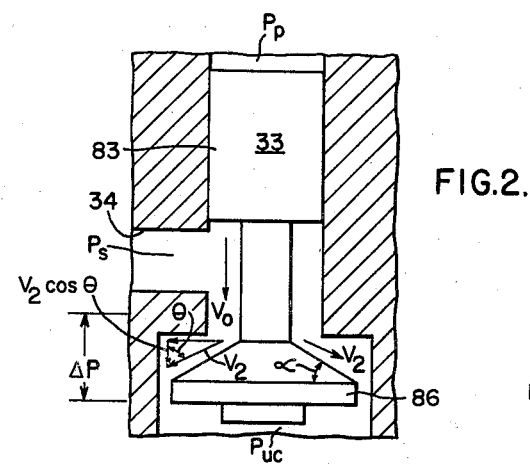
FIG. 2 is a drawing of the inlet power valve of FIG. 1 with the associated pressures which interact during its operation.

FIG. 2 shows an enlarged and somewhat exaggerated illustration of the inlet power valve 33 in FIG. 1. This valve is shown in greater detail to show how the particular design of these valves can provide a specified passive damping and how use is made of the pressure drop across the valve to contribute to the controller system for providing additional damping by feedback action.

If the actuator piston 18 of FIG. 1 has a downward velocity, the inlet power valve 33 opens. The pressure in the upper expansible chamber 20 is equal to the pressure on the underside of the power valve and the symbol $P_{uc}$ in FIG. 2 will represent this upper cylinder pressure. Changing the position of the valve produces a change in momentum of the flowing fluid thereby causing a closing force on the valve and hence a pressure drop across it. Thus:

$$F = \dot{m}(V_0 - V_2 \cos \theta) \quad (1)$$

where $V_0$ is the axial linear velocity of fluid flow approaching the valve $V_2 \cos \theta$ is the axial component of linear velocity of flow leaving the valve $m$ is the mass flow of fluid through the valve F is the force tending to close the valve The pressure drop $\Delta P$ caused by this force is found as follows:

$$\Delta P = F/A \quad (2)$$

where A is the valve area exposed to $\Delta P$.

Test results confirm the calculated prediction that $\Delta P$ is very nearly proportional to $\Delta \dot{m}$, so that the effective passive damping R at the actuator 14 of FIG. 1 is given by:

$$R = \rho A_{uc}^2 \times \frac{\Delta P}{\Delta \dot{m}} \quad (3)$$

where $\rho$ is the mass density of the fluid and $A_{uc}$ is the actuator upper cylinder area 26.

It can be seen from Equations 1 and 2 that if $V_0$ is small and $V_2$ is constant and if either $\cos\theta$ or $A$ can be freely chosen, a valve with a specified damping can be designed. $V_2$ depends on the pressure drop across the respective valves in the following manner:

$$V_2 \text{ (inlet)} = \sqrt{\frac{2(P_s - P_{uc})}{\rho}}; \quad V_2 \text{ (outlet)} = \sqrt{\frac{2(P_{uc} - P_o)}{\rho}} \quad (4)$$

where $P_s$ = supply pressure
$P_o$ = reservoir pressure
$P_{uc}$ = upper cylinder pressure The velocity through a valve actually does change when $\Delta P$ changes but because $\Delta P$ is low with respect to either $(P_s - P_{uc})$ or $(P_{uc} - P_o)$ for small excursions from the quiescent condition about which a valve operates, the departure from linearity is small.

Feedback damping is obtained by impressing $P_{uc}$ and $P_p$, the pilot pressure, on the feedback piston 104 and the pilot feedback piston 82, respectively, in the controller of FIG. 1. In this manner, a torque proportional to $P_p - P_{uc} = \Delta P$ is applied to the weight. An increase in inlet power valve $\Delta P$ corresponding to an increase in downward actuator velocity produces a clockwise torque reducing the inlet area 77 of the pilot valve and increasing the outlet area 78 such that $P_p$ decreases until equilibrium is established. An increase in outlet power valve $\Delta P$ corresponding to an increase in upward actuator velocity produces a counterclockwise torque which has the opposite effect. In either case, because the change in $P_p$ acts upon the upper ends of the power valves, there is an increase $\Delta P_{fb}$ in the pressure drop across the power valve due to the change in pilot pressure $P_p$.

The ratio $\Delta P_{fb}/\Delta P = G_v$ is the damping gain of the controller 10 and is given by $$G_v = A_2 h_2 S \quad (5)$$

where $A_2$ and $h_2$ = feedback piston area and lever arm
$S$ = controller sensitivity defined by $\Delta P_p / \Delta T$, or the change in pilot pressure per unit change in torque about the pivot 46.

The mass gain $G_\delta$ of the controller is defined as the ratio of the "synthetic" body mass added by the controller 10 to the actual body mass. It is computed by $$G = \frac{A_{uc} W_c h_5}{W} S \quad (6)$$

where $A_{uc}$ = total piston area of all the actuators controlled by the controller
$W_c$ = weight of the controller acceleration-sensing member
$h_5$ = horizontal distance from pivot to center of gravity of $W_c$
$W$ = portion of total sprung weight of the vehicle controlled by the controller
$G_v$ and $G_\delta$ = are major parameters determining system performance.

The controller sensitivity is given by $$S = \frac{1}{A_1 h_1 - A_2 h_2 + \frac{K_g h_4^2 + K_f}{h_0 (\Delta P_p / \Delta X)}} \quad (7)$$

where $A_1$ and $h_1$ = pilot feedback piston area and lever arm
$K_g$ = gravity spring linear stiffness
$h_4$ = lever arm of gravity spring
$K_f$ = flexural pivot torsional stiffness
$h_0$ = pilot valve lever arm
$\Delta P_p / \Delta X$ = pilot valve pressure vs. pilot valve displacement at $P_p = \frac{1}{2} P_s$ quiescent conditions.

The pilot valve is balanced to produce negligible variable torque on member 44. Otherwise there would be an additional term in Equation 7.

Other factors being fixed, $G_\delta$ depends only on $$A_1 h_1 - A_2 h_2$$

and $G_v$ depends on this difference as well as upon $A_2 h_2$ directly. Consequently, it is possible to adjust both $G_v$ and $G_\delta$ to the values required for good stabilizer performance by adjusting $A_1 h_1$ and $A_2 h_2$. In practice, $h_2$ is fixed and $A_2$ is chosen to give the desired $G_v$ with the design value of $S$. Piston $A_1$ is mounted eccentrically in a rotatable member so that $h_1$ can be varied to adjust the value of $S$. In an alternate arrangement, both $A_1$ and $A_2$ can be in rotatable members to provide adjustment of both $h_1$ and $h_2$.

It is to be understood that the herein described arrangements are simply illustrative of the principles of the invention, and that other embodiments and applications are within the spirit and scope of the invention.

We claim:
1. In a fluid power actuated stabilizing system for a vehicle having respective relatively movable sprung and unsprung masses,
(A) a fluid power actuator coupled between said sprung and unsprung masses, said actuator having an expansible chamber,
(B) power conduit means coupled to said chamber for carrying power fluid to and from said chamber,
(C) a weight movably mounted on said sprung mass for sensing accelerations of the sprung mass,
(D) a fluid pilot system including a pilot valve and pilot conduit means coupled to the pilot valve for carrying pilot fluid, said pilot valve being responsive to said weight for increasing the pilot fluid pressure when accelerations of the unsprung mass are sensed in a first direction and for decreasing the pilot fluid pressure when accelerations of the unsprung mass are sensed in a second direction,
(E) respective fluid pressure responsive supply and exhaust power fluid valves for respectively supplying and exhausting power fluid from said chamber,
the supply valve having a power fluid outlet coupled to said power conduit means, the exhaust valve having a power fluid intake coupled to said power conduit means,
(F) each of said power valves having movable control means having at one end thereof a pilot fluid pressure responsive first surface in communication with said pilot conduit means whereby said first surface of the control means of each power valve is exposed to said pilot fluid, the said control means of each power valve having at the opposite end thereof a power fluid pressure responsive second surface facing away from said first surface whereby each said control means will be subject to oppositely sensed forces when its said first and second surfaces are exposed to pressure fluids, said second surface of the control means of the supply valve being located at said outlet of that valve whereby that second surface is exposed to said power fluid in said power fluid conduit means, said second surface of the control means of the exhaust valve being located at said intake of that valve whereby that second surface is also exposed to power fluid in said power fluid conduit means, and
(G) feedback means responsive to the difference between the fluid pressures on said first and second surfaces of said control means of said power valves for providing damping for said sprung mass, said feedback means comprising fluid pressure responsive means operatively engaging said weight and fluid-coupled to said pilot conduit means and to said power conduit means for applying a force to said weight in accordance with the difference between the pilot fluid pressure and the power fluid pressure and in a direc- tion to modify the pilot fluid pressure so as to oppose the velocity of the sprung mass relative to the unsprung mass.

2. The combination as in claim 1 wherein said fluid pressure responsive means comprises a first fluid pressure responsive force applier coupled to said pilot conduit means and operatively engaging said weight for applying a force to said weight in one direction, a second fluid pressure responsive force applier coupled to said power conduit means and operatively engaging said weight for applying a force to said weight in the opposite direction, whereby the net force applied to the weight by said force appliers is in accordance with the difference between the pilot fluid pressure and the power fluid pressure and in a direction to modify the pilot fluid pressure so as to oppose the velocity of the sprung mass relative to the unsprung mass.

3. The combination as in claim 1 wherein said weight is pivotally mounted on said sprung mass, and wherein said force applied by said fluid pressure responsive means to said weight produces a torque around the pivotal axis of said weight.

4. The combination as in claim 3 wherein said fluid pressure responsive means comprises a fluid pressure responsive first force applier coupled to said pilot conduit means and operatively engaging said weight for applying a torque to said weight in one direction around the pivotal axis of the weight, and a fluid pressure responsive second force applier coupled to said power conduit means and operatively engaging said weight for applying a torque to said weight in the opposite direction, whereby the net torque applied to the weight by said force appliers is in accordance with the difference between the pilot fluid pressure and the power fluid pressure and in a direction to modify the pilot fluid pressure so as to oppose the velocity of the sprung mass relative to the unsprung mass.

References Cited

UNITED STATES PATENTS

| 2,976,052 | 3/1961 | Hanna | 280—112.1 |
| 2,860,889 | 11/1958 | Hanna | 280—112.1 |
| 3,085,818 | 4/1963 | Hanna | 280—6 |
| 3,095,214 | 6/1963 | Hanna | 280—124 |

PHILIP GOODMAN, Primary Examiner

U.S. Cl. X.R.

280—112.1, 124